United States Patent [19]
Jackson et al.

[11] Patent Number: 5,274,804
[45] Date of Patent: Dec. 28, 1993

[54] AUTOMATIC STORAGE-RECLAMATION POSTMORTEM FINALIZATION PROCESS

[75] Inventors: Franklin R. Jackson, San Francisco; L. Peter Deutsch, Menlo Park; Allan M. Schiffman, Mountain View; David Ungar, Palo Alto, all of Calif.

[73] Assignee: ParcPlace Systems, Sunnyvale, Calif.

[21] Appl. No.: 796,072

[22] Filed: Nov. 20, 1991

[51] Int. Cl.$^5$ ...................... G06F 15/40; G06F 12/00
[52] U.S. Cl. .................................. 395/600; 395/425; 364/DIG. 1; 364/280; 364/281.1; 364/285; 364/282.1
[58] Field of Search .......................... 395/425, 600, 700

[56] References Cited

U.S. PATENT DOCUMENTS 4,853,842  8/1989  Thatte et al. ...................... 395/425

OTHER PUBLICATIONS

Communications of the ACM, Jun. 1983, Lieberman, Henry et al., "A Real Time Garbage Collector Based on the Lifetime of Objects", pp. 419–429.

Primary Examiner—Paul V. Kulik
Attorney, Agent, or Firm—Steven F. Caserza

[57] ABSTRACT

The primary purpose of an automatic storage-reclamation system for digital computers is to reclaim the memory occupied by memory objects that are no longer necessary for the correct operation of the computer programs that are clients of the reclamation system. Those objects that are unnecessary in this respect are commonly called garbage objects or, more simply, garbage, and the act of reclaiming such objects is commonly called garbage collection. Frequently, however, some final action or sequence of actions needs to be taken when a memory object becomes a garbage object, beyond simply reclaiming the memory occupied by such objects. An automated finalization mechanism performs such a pre-specified set of actions when it has determined that a memory object has become garbage. A postmortem finalization mechanism performs these finalization actions only after the garbage object has actually been reclaimed by the system's garbage collector. Delaying the execution of the finalization actions until the object in question has been fully reclaimed prevents this object from accidentally being resurrected as a possible side effect of the finalization actions. A mechanism for supporting postmortem finalization is constructed by extending the capabilities of an automatic storage-reclamation system.

4 Claims, 4 Drawing Sheets

AUTOMATIC STORAGE-RECLAMATION POSTMORTEM FINALIZATION PROCESS

TECHNICAL FIELD

This invention relates to computer systems, particularly to the process of automatic finalization.

BACKGROUND

The primary purpose of an automatic storage-reclamation system for digital computers is to reclaim the memory occupied by memory objects that are no longer necessary for the correct operation of the computer programs that are clients of the reclamation system. Clients typically refer to computer programs that utilize the storage-reclamation system. Objects refer to client data associated with a portion of the computer memory.

A storage-reclamation system is thus a process of reclaiming the memory locations occupied by garbage objects, or garbage, the term commonly used to refer to those memory objects that are no longer necessary. The act of reclaiming such memory objects is commonly called garbage collection, and a garbage collector is a process by which an automatic storage-reclamation system actually reclaims the memory occupied by memory objects that have become garbage.

An automatic storage-reclamation system is capable of reclaiming such memory without explicit instructions from the programs that formerly utilized these objects. Frequently, however, some final action or sequence of actions needs to be taken when a memory object becomes a garbage object, beyond simply reclaiming the memory occupied by such memory objects. Finalization is the sequence of actions that should be performed once a memory object has become garbage. For example, a garbage object may refer to an external resource that is managed by another subsystem. Further, this external subsystem may expect its clients to issue explicit confirmation that they no longer need the external resource, thus making it possible for the external resource to be recycled. Examples of such external resources are the file-system objects managed by the computer's operating system and the various resources utilized by the computer's window-management subsystem.

WHEN TO PERFORM FINALIZATION

Although finalization is, by definition, intended to be performed only after an object has been determined to be garbage, there is still some question as to precisely when the finalization actions for a given garbage object should be taken. The finalization actions can be performed immediately prior to an object's death (i.e., before the object has been destroyed and is no longer accessible to any program), or the finalization actions can be postponed until sometime after an object's death. The former type of finalization permits the resurrection of objects, and thus is termed last-rites finalization, whereas the latter type of finalization does not, and thus is referred to as postmortem finalization.

Last-Rites Finalization

Last-rites finalization is finalization that is performed after the object has been determined to be garbage, but before the object in question has actually been destroyed. In this case, finalization is performed on the object's, "death bed." Every prior art finalization system developed to date has been a last-rites system. The primary advantage of such systems is that all of the information that is contained in the object being finalized is readily accessible to the finalization code since the object in question has not yet been reclaimed. In addition, such systems permit finalizable objects to be resurrected by simply storing a reference to the object being finalized in another live object.

Prior art finalization systems are categorized as either a manual finalization or an automatic finalization system. If a computational environment's run-time system offers no explicit support for performing any actions as a result of a memory object becoming garbage, then the client programs are responsible for taking such actions. When the client programs explicitly take such actions, the client program are performing manual finalization, regardless of whether the client program must explicitly perform finalization as a separate manual step, or whether finalization occurs automatically as a result of manual designation of an object as garbage. Typically, manual finalization is necessary in the client programs if a computational environment's run-time support routines or operating system offer no explicit support or means to detect whether a memory object has become garbage. Automatic finalization is a finalization system added to a computational environment that allows the client programs to specify a set of actions that are to be triggered automatically by the computational environment when a memory object has become garbage.

One advantage of an automatic finalization system over a manual finalization system is the reduction of common programming errors, which may arise from premature finalization or failure to provide finalization, that result in improper operations or a waste of memory resource. Another advantage of an automatic finalization system is that it facilitates the task of writing computer programs.

Typical types of automatic finalization systems are systems that finalize objects with lexical scope or objects with dynamic scope. Lexically scoped objects are those objects whose scope and lifetime, i.e. the duration of time which the object is needed by the program, can be inferred from the text of the program code in which they are elaborated, i.e. declared and initialized. Lexically scoped objects are generally allocated on the system's run-time stack and their lifetime ends when the lexical scope in which they are elaborated is exited. Dynamically scoped objects are those objects whose lifetime has indefinite extent. The lifetime of dynamically scoped objects does not end until the object becomes garbage, typically when they are no longer referenced by another non-garbage object. Such objects are generally allocated on the system's data heap.

Finalization of Objects with Lexical Scope

Since the lifetime of lexically scoped objects ends when the lexical scope in which they were elaborated is exited, the services of an automatic garbage collector is not required to support finalization of such objects. That is, such objects can be finalized immediately before exiting their lexical scope, since, by definition, such objects are considered garbage once this scope is exited. Typically the language's compiler will add a function to each lexical scope that is responsible for executing such finalization actions. This finalization function is then invoked immediately prior to exiting the lexical scope. This type of finalization is known in the art.

Prior Art Finalization of Objects with Lexical Scope

Most of the prior art finalization are for the purpose of finalizing lexically scoped objects. Classes in Simula (O. J. Dahl, B. Myhrhaug, and K. Nygaard, "The SIMULA 67 Common Base Language", Norwegian Computing Centre, Forskningsveien 1B, Oslo, 1968) and envelopes in Pascal Plus (J. Welsh and D. W. Bustard, "Pascal-Plus—Another Language for Modular Programming," Software Practice and Experience, V. 9 No. 11, 1979, 947-957) both permitted the programmer to specify finalization routines that would be executed when the block of code associated with these data entities was exited. Similarly, in a publication by Masaaki Shimasaki, Yoshitoshi Kunieda, and Takao Tsuda, entitled "Applications of Modern Programming Language Concept to Text Processing with a Large Character Set," IFIP Congress Series, 1983 V. 9, 107-112, Shimasaki, et al., describes a programming language called PLAK (Programming Language with Abstract data types for Kanji processing) that supports a notion of finalization modelled on that utilized by Pascal Plus.

In Schwartz et al. (Richard L. Schwartz, P. M. Mellier-Smith, "The Finalization Operation for Abstract Types," 5th International Conference on Software Engineering, San Diego, Calif., Mar., 1981) a detailed semantic model is proposed for the finalization of lexically-scoped abstract data types that was well defined even in the face of exception handling. More recently, the Ada 9X Project Report (Department of Defense, "Ada 9X Project Report: DRAFT Mapping Rationale Document", published by Intermetrics Inc., 733 Concord Ave., Cambridge Mass. 02138, Feb. 1991) discussed the finalization of objects with lexical scope and, in a manner similar to that proposed in Schwartz, et al., specified that the finalization of data should be performed in the reverse order of the data's elaboration. Finally, in a publication authored by Henry G. Baker entitled "Structured Programming with Limited Private Types in Ada: Nesting is for the Soaring Eagles", ACM Ada Letters XI, 5, Jul./Aug. 1991, 79-90, Baker describes how variables of the limited private type in Ada can be finalized and then utilized this technique to implement a garbage-collected Lisp system in Ada.

In C++, the finalization of lexically scoped data is performed by routines known as destructors, as described in Margaret A. Ellis and Bjarne Stroustrup, "The Annotated C++ Reference Manual", Addison-Wesley, Reading, Mass., 1990, 277-280. With the destructor routines, the programmer can define a destructor function for each class of objects, which will be automatically invoked when the lexical scope of a given object is exited.

On the other hand, neither Modula-3 (Luca Cardelli, James Donahue, Lucille Glassman, Mick Jordan, Bill Kalsow, and Greg Nelson, "Modula-3 report", Tech. Rep. ORC-1, DEC Systems Research Center/Olivetti Research Center, Palo Alto/Menlo Park, Calif., 1988) nor Common Lisp (Guy Steele, "Common Lisp: The Language", Digital Press, Burlington, Mass., 1984, 140-142) defines formal semantics for finalization. The closest either language comes to supporting an automatic finalization process is the TRY FINALLY construct in Modula-3 and the UNWIND-PROTECT construct in Common Lisp. Although both of these facilities can guarantee that a pre-specified set of actions will be executed when the block of code with which the construct has been associated is exited (either via normal block termination or via non-local returns), neither finalization construct can be associated directly with a data object.

Finalization of Objects with Dynamic Scope

Since objects with dynamic scope have lifetimes of indefinite extent, the services of an automatic garbage collector are required to support automatic finalization. That is, finalization cannot occur until the garbage collector has detected that the dynamically scoped object has indeed become garbage.

Automatic finalization systems for dynamically scoped objects may be structured by means of an embalming collector or by means of weak references. Weak references are object references that do not prevent the referenced object from being considered garbage. Weak references are sometimes referred to in the literature as weak pointers, soft references, and soft pointers. In contrast, strong references are object references that are sufficient to prevent the referenced object from being considered garbage provided that the referenced object is reachable by the program through a succession of strong references. Strong references are sometimes referred to in the literature as strong pointers, hard references, hard pointers, normal references, normal pointers, ordinary references, and ordinary pointers. In other words, the garbage collector is not permitted to reclaim any object that a program is able to reach through a succession of strong references.

Finalization via an Embalming Collector

An embalming collector is one that directly manipulates an object in order to reclaim its memory. Examples of prior art embalming collectors are the classical mark-sweep garbage collector and the various collectors based on strict reference-counting.

Prior Art Finalization via an Embalming Collector

In Cedar (Paul Rovner, "On Adding Garbage Collection and Runtime Types to a Strongly-Typed, Statically-Checked, Concurrent Language", Tech. Rep. CSL-84-7, Xerox Palo Alto Research Center, Palo Alto, Calif., 1985), the last-rites finalization of dynamically scoped objects is implemented using a reference-counting garbage collector. That is, when an object's reference count drops to zero, then the object is placed on a finalization queue that is later serviced by a finalization process. Since the Cedar garbage collector is conservative (i.e., it does not guarantee that all unreferenced objects will be detected as being garbage), finalization cannot be guaranteed to occur. Programmers, therefore, are warned that the correctness of their programs should not depend upon finalization; rather, they are urged to view finalization as a performance enhancement.

, In Richard L. Hudson, "Finalization in a Garbage Collected World", presented at the OOPSLA '91 Garbage Collection Workshop, Phoenix, Ariz., 1991, semantics have been proposed for a last-rites style of finalization for dynamically scoped objects that is similar to that of Cedar. Hudson views finalization as the last action that is done prior to the destruction of an object. Moreover, Hudson points out that finalization can resurrect an object, thereby avoiding its destruction and making it available to the system again. He also specifies an order in which objects should be finalized, describing how these semantics can be implemented via a copying collector, and points out that these finalization semantics are consistent with those of weak references.

Finalization via Weak References

Many modern garbage collectors do not directly manipulate the garbage objects that they reclaim. As an example, consider a system that utilizes a copying garbage collector. Such a collector does not need to manipulate an object in order to reclaim its memory. The collector simply ignores the garbage objects, and copies the live objects to another area of memory. It then recycles the garbage objects by allowing the system to allocate new objects in the area of memory containing the garbage objects, thereby overwriting the garbage objects.

Such a collector must somehow keep track of any object that is subject to finalization so that it will not forget to perform the finalization actions when that object becomes garbage. Keeping track of such objects is equivalent to maintaining a weak reference to the objects. That is, the garbage collector maintains an object reference that does not keep the object in question from being considered garbage. In fact, some prior art systems have built their finalization mechanisms directly atop a weak reference subsystem.

Prior Art Finalization via Weak References

The News (Networked Window System) developed by Sun Microsystems not only supports the finalization of dynamically scoped objects, but does so using a weak-reference subsystem. To finalize an object, one has only to establish a weak reference to the object in question and then express interest in receiving notification when this object is only referenced weakly. If the object's strong reference count subsequently drops to zero, but is still referenced weakly, then News will use its event-dispatching mechanism to dispatch an obsolete event to those clients who earlier expressed interest.

Upon receiving the obsolete event, clients can then perform the appropriate finalization actions, including destroying the weak reference to the object, which will ultimately cause the object to be reclaimed by the garbage collector if there are no other references to it. Alternatively, client code can respond to the obsolete event by resurrecting the obsolete object by converting the weak reference to a strong one (News supplies protocol to both strengthen and weaken a given reference).

The News finalization mechanism was apparently designed to break cycles of objects that otherwise could not be reclaimed by their reference-counting garbage collector. Client code is expected to weaken one of the links of such user-defined data cycles. Client code can then actually break the link when it receives notification that the object referenced by this weak link is now obsolete (i.e., the object is now only referenced weakly). Once this link is broken, the data cycle will be broken, which will then enable the garbage collector to reclaim the memory occupied by the various objects in the cycle. In other words, the NEWS system supports a last-rites finalization mechanism, and thus no postmortem finalization mechanism exists in the prior art.

Problems can occur with last rites finalization, however, if an unintended resurrection occurs (i.e., if the object being finalized is kept alive as an unintended side effect of the finalization actions or as a result of actions taken by other parts of the system prior to the object being reclaimed). For example, if a file-system object is finalized, its finalization code may instruct the operating system to recycle the associated file descriptor. If, however, the file system object is accidently kept alive, it may be later accessed, which will cause a run-time error in the underlying operating system if the accessing code attempts to use the now recycled file descriptor. None of the prior art systems support postmortem finalization. There is therefore a need for a postmortem, finalization technique that is used specifically to avoid the problem of unintended resurrection.

SUMMARY OF THE INVENTION

In accordance with the teachings of this invention, a postmortem finalization mechanism triggers the finalization actions only after the object in question has been destroyed. This technique avoids the unintended-resurrection problem. Since the finalization code cannot access the object being finalized, such code keeps a copy of any information contained in the object being finalized that is necessary for finalization. This may be done, for example, by creating, in advance, an heir object to the object being finalized. The heir object contains a copy of all necessary information from the object being finalized required for the finalization process. By this method of finalization, the object being finalized may be effectively resurrected by simply installing the heir object in the place of the finalized object provided that the heir object is a duplicate of the finalized object.

Given a system that supports automatic garbage collection, weak references, and a notification mechanism, a postmortem finalization system is provided by including in a garbage collection process means to overwrite obsolete weak references with a special value that is distinct from ordinary object references. The garbage collection process then adds any object containing an overwritten weak reference to a finalization queue. Once such an object is added to the finalization queue, the garbage collector notifies a finalization process that the finalization queue is non-empty. The finalization process, when notified that the finalization queue is non-empty, extracts these objects from the queue. It then uses a system's notification means to issue a death certificate to any object which previously indicated a desire to receive notification when the object that was associated with the overwritten weak reference has been reclaimed.

DESCRIPTION OF SPECIFIC EMBODIMENTS

An automated finalization mechanism performs a pre-specified set of actions when it has determined that a memory object has become garbage. A postmortem finalization mechanism performs these finalization actions only after the garbage object has actually been reclaimed by the system's garbage collector. Delaying the execution of the finalization actions until the object in question has been fully reclaimed prevents this object from accidentally being resurrected as a possible side effect of the finalization actions. The problem of unintended resurrection thus does not arise when finalizing lexically scoped data, since such data is, by definition, destroyed when the lexical scope in which they are elaborated is exited. No attempts to finalize such data will therefore be made after the enclosing lexical scope is exited, since the data is already destroyed.

Postmortem Finalization

Figure 1:
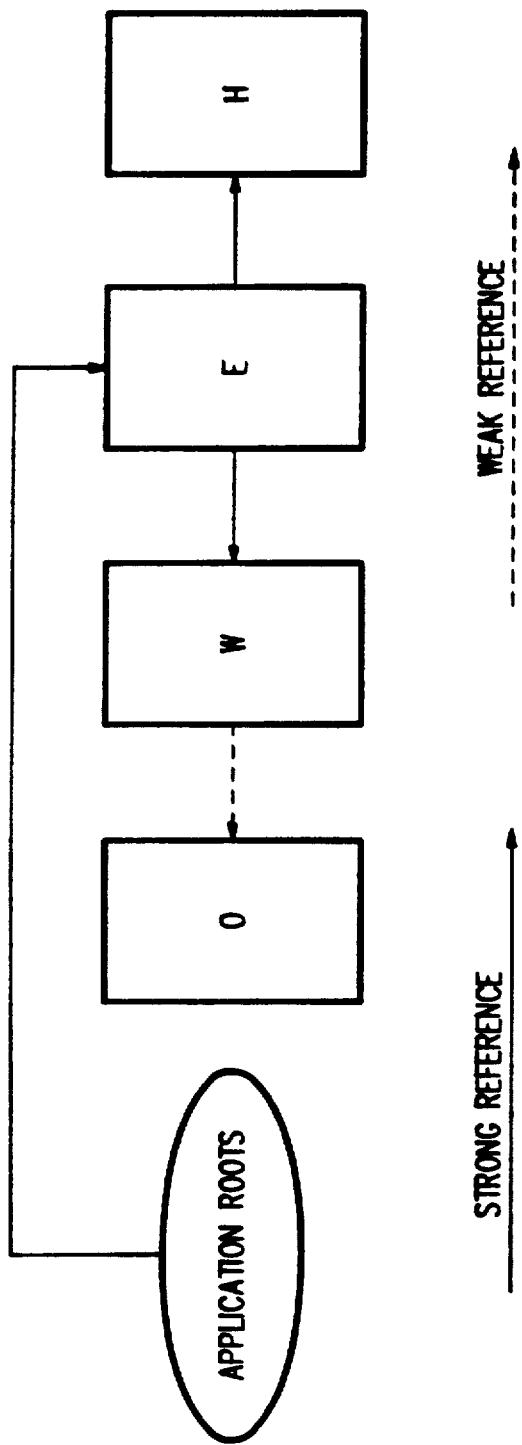
FIG. 1 is a block diagram depicting the relationship between objects required by a postmortem finalization system constructed in accordance with the principles of this invention, in order to finalize object O.

FIG. 1 shows a block diagram depicting the relationship between the objects required by a postmortem finalization system constructed in accordance with the principles of this invention. A postmortem finalization mechanism triggers the finalization actions only after the object in question has been destroyed, and thus this process avoids the unintended-resurrection problem of the last-rites finalization processes of the prior art. Since the finalization code cannot access the object O being finalized, a copy of the information contained in object O which is necessary for finalization is generated by creating, in advance, an heir object (shown as block labelled H in FIG. 1) to object O which is being finalized. Heir object H contains a copy of all necessary information of object O required for the finalization process. This method of finalization does not permit resurrection. However, if needed, object O may be effectively resurrected by simply installing heir object H in the previous memory location in which object O resided.

A Postmortem Finalization System Using Weak References

Given a system that has facilities for supporting automatic garbage collection, weak references, and a notification mechanism, one embodiment of a postmortem finalization system may be provided in accordance with the principles of this invention using weak references. For example, to perform postmortem finalization actions $F_1, F_2, \ldots F_n$ on objects $O_1, O_2, \ldots O_n$, respectively, should any of the objects $O_1, O_2, \ldots O_n$ becomes garbage, additional weak objects $W_1, W_2, \ldots W_n$ are generated by the client program, where object $W_i$ contains a weak reference to object $O_i$, for all i where $1 < i < n$. In this case, $O_i$ is said to be "registered" with $W_i$. Further, the client constructs a set of executor objects $E_1, E_2, \ldots E_n$, where $E_i$ has access to the finalization code that implements the finalization actions $F_i$, for all i where $1 < i < n$. $E_i$ is referred to as the "executor" of $O_i$. Client-created heir objects $H_i$ containing a copy of all necessary information required for finalization are made accessible to executors Ei. In addition, $E_i$ is registered with a notification mechanism such that $E_i$ will receive notification whenever $W_i$ suffers a death (i.e., whenever an object referenced weakly from $W_i$ is reclaimed by the garbage collector). Notification mechanism refers to any means by which clients can register themselves as being interested in receiving notification that certain pre-specified events have occurred. There are many possible ways to implement such a notification mechanism. For example, Smalltalk's dependency-updating mechanism, as described in Adele Goldberg and David Robson, "Smalltalk-80: The Language", Addison-Wesley, Reading, Mass., 1989, 240-243, is one such system, as are the various event-dispatching mechanisms such as that employed by News ("News 2.1 Programmer's Guide. Revision A", Sun Microsystems, Inc. Mountain View, Calif., 1990, 221-225).

Figure 2:
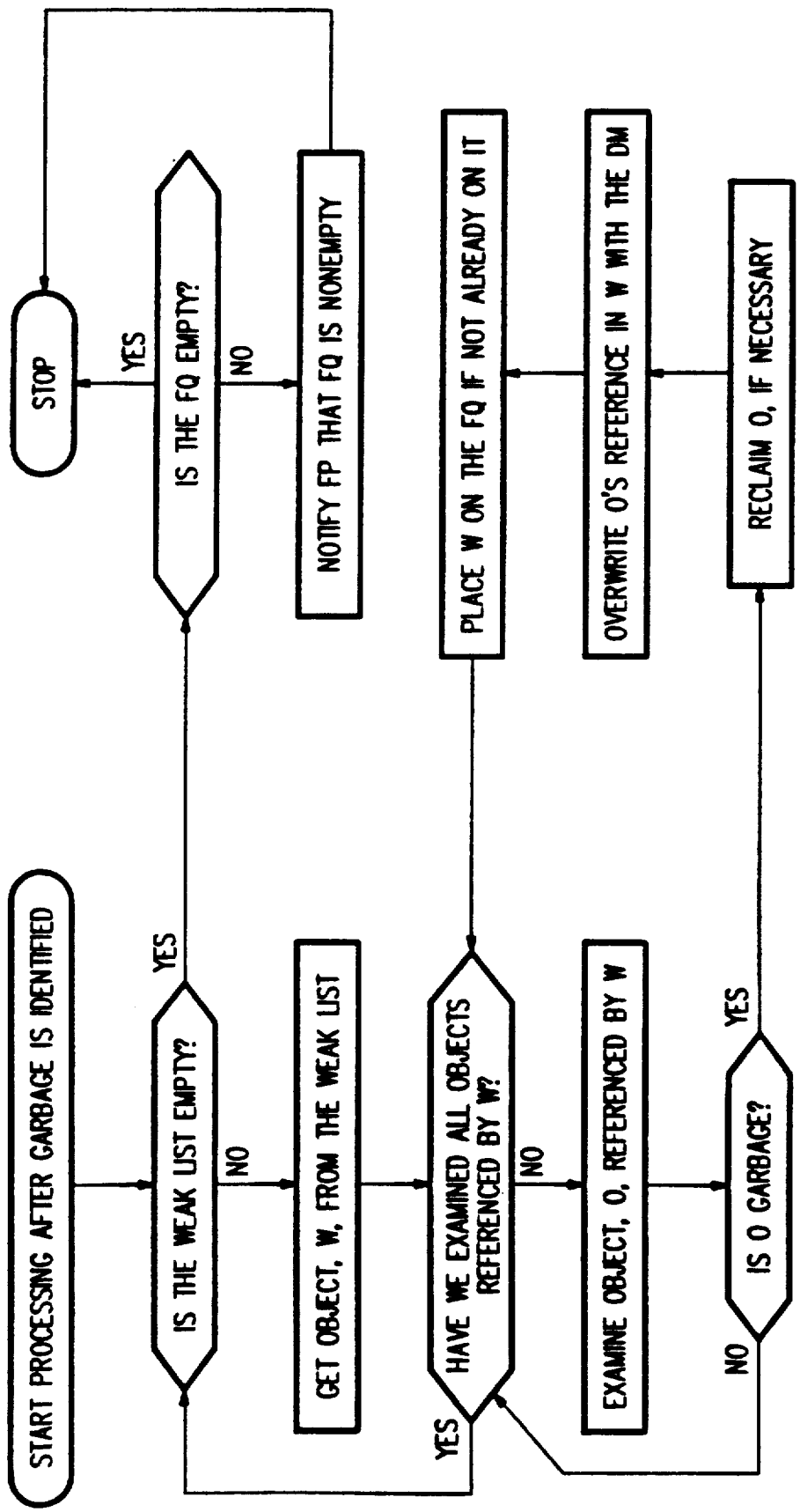
FIG. 2 is a block diagram of one embodiment of a garbage collector extension constructed in accordance with the principles of this invention to support the postmortem finalization system of this invention.

FIG. 2 is a block diagram of one embodiment of a garbage collector extension constructed in accordance with the principles of this invention to support the postmortem finalization system of this invention. Once the garbage collection process determines that an object $O_i$ has become garbage, the garbage collection process reclaims the memory occupied by $O_i$ and ensures that the weak reference from $W_i$ to $O_i$ is replaced with a death marker reference DM to distinguish that weak reference from all other ordinary object references.

Figure 3:
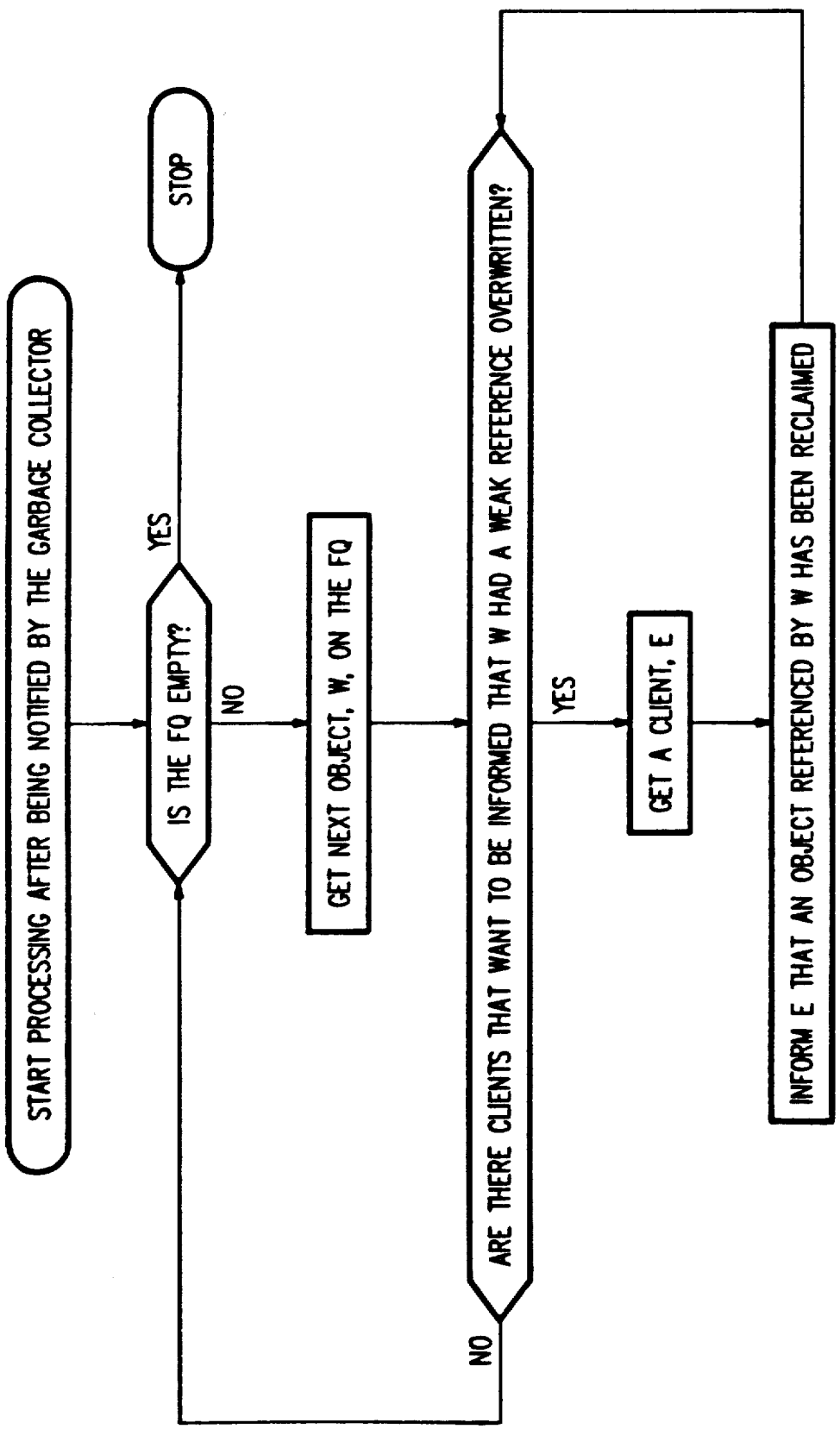
FIG. 3 is a block diagram of one embodiment of a finalization process referenced by the process of FIG. 2.

To support finalization, the garbage collection process is extended so that, at the end of each reclamation phase, it places all weak objects $W_i$ having a weak reference overwritten with death marker reference DM on a finalization queue FQ. Having placed all such weak objects $W_i$ on finalization queue FQ, the garbage collector then notifies finalization process FP that finalization queue FQ is non-empty. FIG. 3 shows one embodiment of a finalization process FP which removes each object from finalization queue FQ and then invokes the system's notification mechanism to notify objects, such as Ei, which indicated interest in receiving "death certificate" notification that the extracted object $W_i$ suffered a death.

If $E_i$ has asked to be notified in the event that $W_i$ suffered a death, $E_i$ will receive a death certificate notification upon $W_i$ being extracted from finalization queue.

If the same $W_i$ references more than one $O_j$, the executor $E_i$ can respond to the receipt of the death certificate by scanning the contents of $W_i$ searching for the reference DM, and deduce from the location of the DM that the object $O_j$ has been reclaimed. If Wi has only one weak reference, the executor Ei can deduce from the identity of $W_i$ which $O_i$ has been reclaimed, without scanning.

Figure 4:
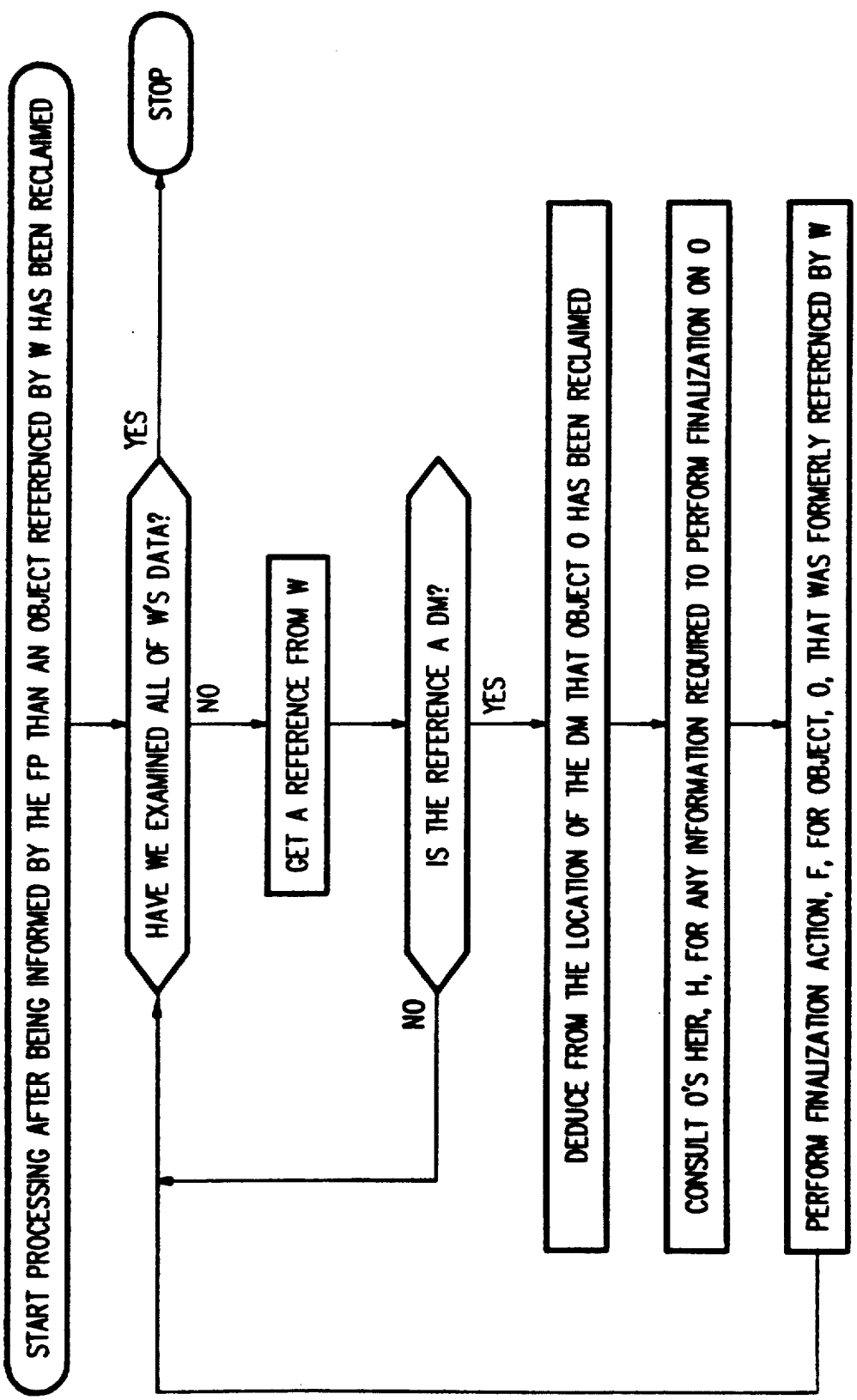
FIG. 4 is a block diagram of one embodiment of an executor process of FIG. 3.

FIG. 4 shows one embodiment of a finalization code which scans, if needed, $W_i$ for death marker reference DM in order to deduce whether object $O_i$ has been reclaimed. Once the reclamation of object $O_i$ has been detected, $E_i$ can then invoke the appropriate finalization action $F_i$.

Using an Embalming Collector

In an alternative embodiment, given a system that has an embalming garbage collection and a notification mechanism, a post-mortem finalization process may also be provided by having the embalming garbage collector check to see if the object is subject to finalization when the garbage collector is reclaiming a garbage object. In this embodiment, the postmortem finalization process assumes that the garbage collection process has means to denote that an object is subject to finalization, for example, by means of a bit in the object's header which may be reserved for this purpose. Once the garbage collector has determined that an object should be finalized, it then notifies an executor that the object has expired and should be finalized.

The automatic postmortem memory storage finalization process described in accordance with the principles of this invention thus avoids unintended resurrection problems by invoking finalization actions after the garbage collector destroys the objects marked to be finalized as garbage.

All publications mentioned in this specification are herein incorporated by reference to the same extent as if each individual publication was specifically and individually indicated to be incorporated by reference.

The invention now being fully described, it will be apparent to one of ordinary skill in the art that many changes and modifications can be made thereto without departing from the spirit or scope of the appended claims.

What is claimed is:

1. An automatic postmortem finalization process to allow automatic invocation of predefined final actions for one or more reclaimed objects processed by a garbage collection sequence, said automatic postmortem finalization process comprising the steps of:
   providing to said postmortem finalization process a set of associated objects, wherein said set of associated objects comprises:
   one or more heir objects, each of said one or more heir objects replicating at least some information in an associated object to be finalized; and
   one or more executor objects, each of said one or more executor objects registered with a notification means to receive notification of destruction of said associated object to be finalized;
   analyzing a reserved bit associated with each of said one or more reclaimed objects indicating if said reclaimed object is subject to finalization; and
   invoking a system notification means, said system notification means providing a notice to said one or more executor objects indicating interest in receiving notice that said one or more reclaimed objects have been reclaimed by said garbage collection sequence.

2. An automatic postmortem finalization process of claim 1 wherein said finalization process further comprises the steps of executing an executor finalization sequence to invoke one or more final actions.

3. An automatic postmortem finalization process to allow automatic invocation of predefined final actions for one or more reclaimed objects processed by a garbage collection sequence, said automatic postmortem finalization process comprising the steps of:
   providing to said postmortem finalization process a set of associated objects, wherein said set of associated objects comprises:
   one or more heir objects, each of said one or more heir objects replicating at least some information in an associated object to be finalized;
   one or more weak objects, each of said one or more weak objects having one or more corresponding weak references associating said weak object to said associated object to be finalized; and
   one or more executor objects, each of said one or more executor objects registered with a notification means to receive notification of destruction of said associated object to be finalized;
   scanning said one or more weak references in each said weak object to detect said one or more reclaimed objects;
   overwriting each weak reference associated with said one or more reclaimed objects detected with a death marker reference;
   placing each said weak object having associated with said weak object a death marker reference on a finalization queue;
   notifying a finalization process sequence that said finalization queue is non-empty; and
   executing said finalization process, said finalization process further comprising the steps of:
   extracting each weak object from said finalization queue; and
   invoking a system notification means, said system notification means providing a notice to said one or more executor objects indicating interest in receiving notice that said one or more reclaimed objects have been reclaimed by said garbage collection sequence.

4. An automatic postmortem finalization process of claim 3 wherein said finalization process further comprises the steps of executing an executor finalization sequence to invoke one or more final actions.

* * * * *